US007173408B2

(12) United States Patent
Huang

(10) Patent No.: US 7,173,408 B2
(45) Date of Patent: Feb. 6, 2007

(54) ADJUSTABLE REGULATED POWER DEVICE

(75) Inventor: Guang-Jian Huang, Hsinchu (TW)

(73) Assignee: Winbond Electronics Corp., Hsinchu (TW)

( * ) Notice: Subject to any disclaimer, the term of this patent is extended or adjusted under 35 U.S.C. 154(b) by 45 days.

(21) Appl. No.: 11/187,093

(22) Filed: Jul. 22, 2005

(65) Prior Publication Data

US 2006/0192544 A1 Aug. 31, 2006

(30) Foreign Application Priority Data

Feb. 25, 2005 (TW) ............................ 94105746 A

(51) Int. Cl.
*G05B 24/02* (2006.01)

(52) U.S. Cl. ...................................................... 323/354

(58) Field of Classification Search ................ 323/354, 323/367, 353, 352
See application file for complete search history.

(56) References Cited

U.S. PATENT DOCUMENTS 6,819,090 B1 * 11/2004 Kachline .................... 323/237

* cited by examiner

*Primary Examiner*—Shawn Riley
(74) *Attorney, Agent, or Firm*—J.C. Patents

(57) ABSTRACT

An adjustable regulated power device includes, for example, an electronic potential device, a regulated device and a control device. The electronic potential device includes an electronic potentiometer having a plurality of potentiometers. The regulated device includes a voltage regulator connected to an input power and at least one first potentiometer of the potentiometers. The first potentiometer forms a variable resistor used for adjusting an output voltage from the voltage regulator. The control device includes a microprocessor and a control input device used for receiving an input setting value. The microprocessor is connected to the control input device and the electronic potentiometer for receiving the setting value and controlling the electronic potentiometer according to the setting value.

20 Claims, 5 Drawing Sheets

ADJUSTABLE REGULATED POWER 100a

ADJUSTABLE REGULATED POWER 100a

ADJUSTABLE REGULATED POWER DEVICE

CROSS-REFERENCE TO RELATED APPLICATION

This application claims the priority benefit of Taiwan application serial no. 94105746, filed on Feb. 25, 2005. All disclosure of the Taiwan application is incorporated herein by reference.

BACKGROUND OF THE INVENTION

1. Field of Invention

The present invention relates to a regulated power device. In particular, it relates to an adjustable regulated power device with high voltage/current adjustment accuracies and a compact size.

2. Description of the Related Art

In the conventional technology, the output voltage from a voltage regulated power mostly is fixed. To fulfill an adjustable output voltage, it is usually to incorporate the conventional voltage regulated power with an additional adjustment potentiometer, or to use a resistance array voltage divider for rang-selected adjustments. These methods, however, are usually applicable to low-end products. The shortage thereof is that the above-mentioned circuits are in full analog control modes. To adjust output voltages, the output voltages must be displayed on a reading scale of a voltage meter. Then, the user needs to adjust a potentiometer to get a required output voltage with a quite inconvenience. In addition, a more problematic shortage is that an accidental touch with the adjustment potentiometer during operations would change the output voltage value. Therefore, such control modes are not enough for safety. A faulted output voltage even damages the connected load device.

To improve the above-described shortages in the conventional technology, in recent years, a digital DC regulated power controlled by a single chip microcomputer has been developed. Wherein, the single chip microcomputer is usually used to control a digital to analog converter (DAC) for outputting a voltage corresponding to a target voltage value, followed by comparing the output voltage from the power with the target voltage value for a feedback to a voltage adjustment system. By this way, the output voltage from the power is controlled and the regulated power can output a desired voltage. However, the shortages with such method are an oversized circuit structure and a higher cost, which make it hard for popular applications.

In order to overcome the aforementioned shortages in the conventional technology, it is quite demanded to develop a regulated power with a low cost, a high safety, a high reliability, full functions, convenient operations and high voltage/current adjustment accuracies.

SUMMARY OF THE INVENTION

Based on the above-mentioned considerations, the present invention provides an adjustable regulated power device, which can fulfill digital inputs by a keyboard and control electronic potentiometers by a microprocessor to complete many functions, such as voltage adjustments, a feedback control, a current-limit protection, constant current/current-limit value adjustments. The provided device is also capable of displaying a target voltage value and a current-limit value by a display. Therefore, the provided power device features a low cost, a high safety/reliability, full functions, convenient operations, high voltage/current adjustment accuracies and a compact size.

In addition, the present invention also provides another adjustable regulated power device suitable for, for example, adjustable regulated switching power devices, which can fulfill digital inputs by a keyboard and control electronic potentiometers by a microprocessor to complete many functions, such as voltage adjustments, a feedback control, a current-limit protection, constant current/current-limit value adjustments. The provided device is also capable of displaying a target voltage value and a current-limit value by a display. Therefore, the provided power device features a low cost, a high safety/reliability, full functions, convenient operations, high voltage/current adjustment accuracies and a compact size.

According to an embodiment, the adjustable regulated power device of the present invention includes, for example, an electronic potential device, a voltage regulation device and a control device. The electronic potential device includes an electronic potentiometer with a plurality of potentiometers. The voltage regulation device includes a voltage regulator, which is connected to an input power and at least one first potentiometer of above-mentioned potentiometers. Moreover, the first potentiometer forms a variable resistor, which is able to adjust an output voltage from the voltage regulator. And, the control device includes a microprocessor and a control input device. The control input device is used for receiving a preset value input. The microprocessor is connected to the control input device and the electronic potentiometer for receiving the preset value and controlling the electronic potentiometer according to the preset value.

According to an embodiment, the adjustable regulated power device of the present invention suitable for, for example, adjustable regulated switching power devices includes an electronic potential device, an output/input stage, a switching device, a voltage regulation device and a control device. The electronic potential device includes an electronic potentiometer with a plurality of potentiometers. The output/input stage is used for connecting an input power and producing an adjustable output voltage. The switching device is connected to the output/input stage. The voltage regulation device includes a voltage regulator connecting to the output/input stage, the switching device and at least one first potentiometer of the potentiometers. Moreover, the first potentiometer forms a variable resistor used for controlling the voltage regulation device and a closed feedback loop formed in the switching device through the voltage regulator. Consequently, the voltage of the output/input stage is regulated. The control device includes a microprocessor and a control input device used for receiving a preset value input. The microprocessor is connected to the control input device and the electronic potentiometer for receiving the preset value and controlling the electronic potentiometer according to the preset value.

In an embodiment of the present invention, the above-described adjustable regulated power device further includes, for example, a comparison device formed by a sampler and a comparator. The sampler is used for sampling the current with the output voltage to produce a sampling signal. The comparator is connected to a second potentiometer among the potentiometers and the sampler for receiving and comparing a base voltage from the second potentiometer and the sampling signal from the sampler, followed by outputting a comparison result.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve for explaining the principles of the invention.

DESCRIPTION OF THE EMBODIMENTS

Figure 1A:
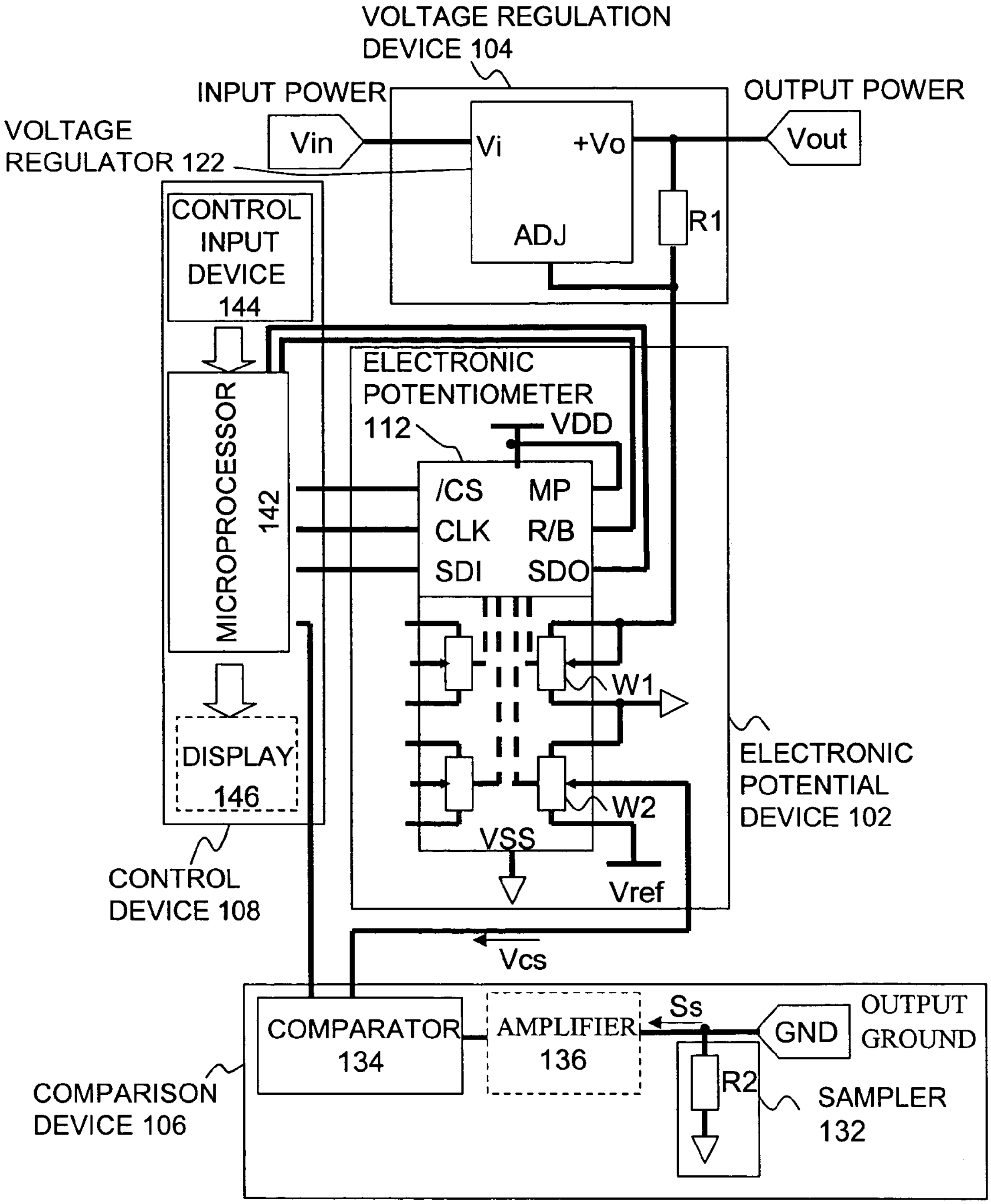
FIG. 1A is a schematic circuit drawing of an adjustable regulated power device according to an embodiment of the present invention.

FIG. 1A is a schematic circuit drawing of an adjustable regulated power device according to an embodiment of the present invention. Referring to FIG. 1A, the adjustable regulated power device 100*a* includes, for example, an electronic potential device 102, a voltage regulation device 104, a comparison device 106 and a control device 108.

The electronic potential device 102 includes, for example, an electronic potentiometer 112. In an embodiment of the present invention, the electronic potentiometer 112 is, for example, an electronic potentiometer model WMS7204 (as shown in FIG. 1A, included of four sets of potentiometers) manufactured by Winbond Electronics Ltd. In addition, the electronic potentiometer can be an electronic potentiometer model WMS7202 (comprised of two sets of potentiometers) manufactured by Winbond Electronics Ltd., or any other kinds of electronic potentiometers. It is not limited to the one shown in any embodiments of the present invention. The electronic potentiometer WMS7204 or WMS7202 is linearly adjustable with 256-steps, it has a high stepped accuracy (see the detailed description hereafter). In FIG. 1A, a center tapped end of a potentiometer W1 is connected to an end of the potentiometer to form a variable resistor, and connected to the voltage regulation device 104. The other end of the potentiometer W1 is grounded. An end of a potentiometer W2 is grounded, the other end thereof is connected to a reference voltage Vref, and the center tapped end thereof is connected to the comparison device 106 for outputting a base voltage Vcs to the comparison device 106.

The voltage regulation device 104 includes, for example, a voltage regulator 122 and a resistor R1. In an embodiment of the present invention, the voltage regulator includes, for example, a voltage regulation integrated circuit (IC) LM317. The IC input end Vi is connected to an input power Vin, the IC output end +Vo is connected to an output voltage Vout, and the reference end thereof ADJ is connected to the potentiometer W1. An end of the resistor R1 is connected to the output voltage Vout, and the other end thereof is connected in series to the variable resistor formed by the potentiometer W1.

The comparison device 106 includes, for example, a sampler 132 and a comparator 134. The sampler 132 is used for sampling the current of the output voltage Vout and included of, for example, a resistor R2 connected between an output ground GND and a ground. In this way, a current sampling signal Ss of the output voltage is taken out from the output ground GND and then input into the comparator 134. The comparator 134 is used for receiving and comparing the sampling signal Ss and the base voltage Vcs to output a comparison result to the control device 108. The comparison device 106 further includes, for example, an amplifier 136, which is connected between the sampler 132 and the comparator 134 for receiving and amplifying the current sampling signal Ss, followed by sending the amplified signal into the comparator 134.

The control device 108 includes, for example, a microprocessor 142 and a control input device 144. The input/output port (I/O port) of the microprocessor 142 connects to the electronic potentiometer 112 used for setting a value of the electronic potentiometer 112, and accessing the values in a memory of the electronic potentiometer 112. The control input device 144 is connected to the microprocessor 142 and functions as an input device or a control device of adjustable regulated power 100*a*. The control input device 144 can be, for example, a keyboard, a keypad, a mouse, a light pen or the other input devices. In addition, the control device 108 further includes a display 146 connected to the microprocessor 142, by which such as the digital values input from the control input device 144, output voltage setting values, current-limit values and the operation status are displayed. The display 146 can be, for example, a liquid crystal display (LCD), a light emitting diode display (LED display) or a screen.

Referring to FIG. 1A, assuming the voltage regulation IC LM317 is chosen as the voltage regulator 122, the output voltage Vout can be expressed by the following equation (1):

$$Vout = 1.25V \times \frac{R1 + W1}{R1} = 1.25V + 1.25V \times \frac{W1}{R1} \tag{1}$$

Wherein, W1 is the resistance of the variable resistor formed by the potentiometer W1, R1 is the resistance of the resistor R1. In an embodiment of the present invention, W1 ranges between zero and the nominal maximum value of the electronic potentiometer 112 and linearly adjustable in 256 steps in the whole range. Therefore, any individual output voltage value Vout is proportional to a potentiometer value W1. As long as the R1 and nominal maximum value are properly selected, the linearly adjustable requirement of the output voltage in the desired range can be achieved.

Taking an example, the selected nominal maximum value is 10 KOhm and R1 is 3.3 KOhm. By the equation (1), when W1 is about 0, the minimum value of the output voltage Vout is about 1.25V, and the maximum value of the output voltage Vout can be roughly calculated: Vout=1.25V+1.25V×10/3.3=5.04V.

Thus, the output voltage Vout is linearly adjustable in 256-steps in a range of 1.25V to 5V.

In an embodiment of the present invention, when a user enters a voltage value by the control input device 144, the microprocessor 142 would calculate a corresponded W1 by the equation (1). Then, W1 is set through an interface of the electronic potentiometer 112 (for example, /CS, CLK, SDI, etc., shown in FIG. 1A). Next, the voltage regulation device 104 controls the output voltage Vout to be the input value. Meanwhile, the microprocessor 142 displays the input voltage value on the display 146. On the other hand, the sampler 132 would sample the output voltage, for example, sample the current of the output voltage. To reduce the influence of the sampler 132 on the output resistor in the output circuit, the sampling resistance of the sampler 132 (as shown the resistance R2 in the figure) must be very small (0.1 Ohm, for example). As a result, the sampling signal Ss is accordingly small and should be amplified to an extent by the amplifier 136.

In an embodiment of the present invention, the potentiometer W2 is used for producing, for example, a base voltage Vcs proportional to a current-limit setting value. As shown in FIG. 1A, to increase the control accuracy, an end of the potentiometer W2 is connected to the reference voltage Vref, and the other end is grounded. The center tapped end thereof is used for outputting the base voltage Vcs. Consequently, the base voltage Vcs is only related to the stepped accuracy and the reference voltage Vref, which results in a very high accuracy of the base voltage Vcs due to the high stepped accuracy of the potentiometer 112.

As mentioned above, the comparator 134 simultaneously receives and compares the sampling signal Ss and the base voltage Vcs. In an embodiment of the present invention, once the value of sampling signal Ss reaches the value of the base voltage Vcs, the comparison result outputted from the comparator 134 gets phase-inverted. Meantime, the microprocessor 142 would decrease the value of the potentiometer W1 while detecting an inverted output signal from the comparison device 106. In this way, the output voltage Vout and the current thereof are decreased as well, which results in a decreased value of sampling signal Ss. In addition, at the same time a constant current mark can also be displayed on the display. Such status lasts until the comparison result from the comparison device 106 by comparing the sampling signal Ss and the base voltage Vcs is no longer phase-inverted. Subsequently, the microprocessor 142 no longer decreases the value of the potentiometer W1. Thus, the output voltage Vout and the current thereof are limited, along with which the current-limit function is fulfilled.

In an embodiment of the present invention, after the system is in a current-limit status, except to check the current of the output voltage Vout for affirming whether reaching or exceeding a current-limit value Iset or not, the microprocessor 142 also controls the potentiometer W2 to produce another base voltage a little smaller than the base voltage Vcs corresponding to the current-limit value Iset (named as the second base voltage Vcs2 hereafter). An output current value corresponding to the second base voltage is named as the second current setting value Iset2, which is smaller than the current-limit value Iset for a Δ value. In the present invention, the second current setting value Iset2 is determined by the related conditions. It is supposed that Δ=0.05 A and the current-limit value is 1 A, then the second current setting value Iset2 is 0.95 A. When the potentiometer W2 outputs the second base voltage Vcs2, the microprocessor 142 would check the output from the comparison device 106. If the output is phase-inverted, it indicates the current of the output voltage is larger than the second current setting value Iset2. When the output voltage drops too much, or a load variation causes the output current to fall down below the second current setting value Iset2, the output from the comparison device 106 would not be phase-inverted. Meantime, the microprocessor 142 would increase the value of the potentiometer W1 to get a larger output voltage Vout. Thus, the value of the sampling signal Ss is also accordingly increased. When such increasing trend comes to a point, that is, the comparison result from the comparison device 106 by comparing the second base voltage Vcs2 and the sampling signal Ss is phase-inverted, the microprocessor 142 would no longer increase the value of the potentiometer W1. Thus, the output current is controlled between the current-limit value Iset and the second current setting value Iset2, along with which the constant current function is fulfilled. In an embodiment of the present invention, if the output voltage Vout is continuously increased to the output voltage setting value, and the output current still doesn't reach the second current setting value Iset2 therewith, then Vout would no longer be increased and the system comes to a constant voltage status.

In addition, the adjustment range of the output voltage Vout can be determined by the following method. It is supposes that the maximum operation voltage of the electronic potentiometer 112 is, for example, 5.5V, and the minimum output voltage of the voltage regulator 122 is, for example, 1.25V, then the adjustment range of the output voltage Vout with such combination is from 1.25V to 6.75V.

In an embodiment of the present invention, the electronic potentiometer 112 includes, for example a flash memory to store data. Therefore, even after a power-off, the user data would not be lost. Since the microprocessor 142 is utilized, the present invention has additional memory and fast-searching functions for the common-used output voltage values and the current-limit values. The other additional functions can also be easily added.

Figure 1B:
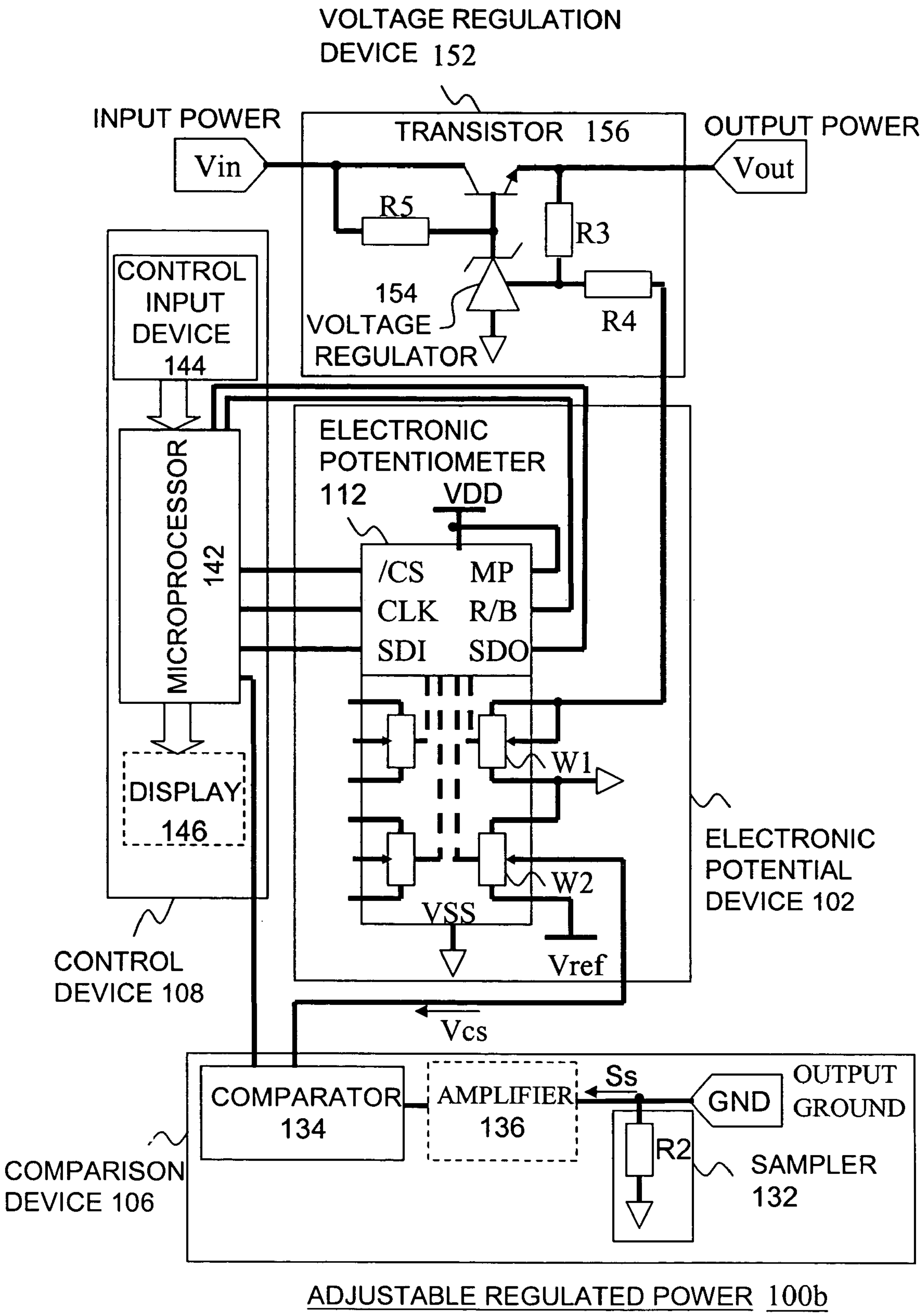
FIG. 1B is a schematic circuit drawing of an adjustable regulated power device according to another embodiment of the present invention.

FIG. 1B is a schematic circuit drawing of an adjustable regulated power device according to another embodiment of the present invention. Referring to FIG. 1B, the adjustable regulated power device 100*b* includes, for example, an electronic potential device 102, a comparison device 106 and a control device 108, and all these are the same as the ones in FIG. 1A. The adjustable regulated power device 100*b* further includes, for example, a voltage regulation device 152, which is different from the one in FIG. 1A.

Referring to FIG. 1B, the voltage regulation device 152 includes, for example, a voltage regulator 154, a transistor 156 and resistors R3, R4, and R5. In an embodiment of the present invention, the voltage regulator 154 can include, for example, a voltage regulation integrated circuit (IC) TL431. The anode of the IC is grounded, and the cathode thereof is connected to the resistor R5 and the base of the transistor 156. Another end of the resistor R5 and the collector of the transistor 156 are together connected to an input power Vin. The emitter of the transistor 156 is connected to an output voltage Vout.

Continuing to FIG. 1B, if the voltage regulator 154 is TL431, then the output voltage Vout can be expressed by the following equation (2):

$$Vout = 2.5V \times \frac{R3 + R4 + W1}{R4 + W1} = 2.5V + 2.5V \times \frac{R3}{R4 + W1} \quad (2)$$

Wherein, W1 is the resistance of the variable resistor formed by the potentiometer W1, R3 and R4 are the resistances of the resistors R13 and R4. In an embodiment of the present invention, it is supposed that the nominal maximum value of the electronic potentiometer 112 is, for example, 10 KOhm, R3 and R4 are 12.5 KOhm, and 2.5 KOhm, respectively. By the equation (2), when W1 is about 10 KOhm, the minimum output voltage Vout can be roughly calculated, Vout=2.5V+2.5V×12.5/12.5=5V. And, when W1 is about 0, the maximum output voltage can be roughly calculated, Vout=2.5V+2.5V×12.5/2.5=15V. Thus, the output voltage Vout is linearly adjustable in 256 steps in the whole range from 5V to 15V. Differing from the adjustable regulated power device 100*a* in FIG. 1A, the maximum operation voltage of the electronic potentiometer 112 does not limit the output voltage of the adjustable regulated power device 100*b*, thus the output voltage can be higher.

Figure 1C:
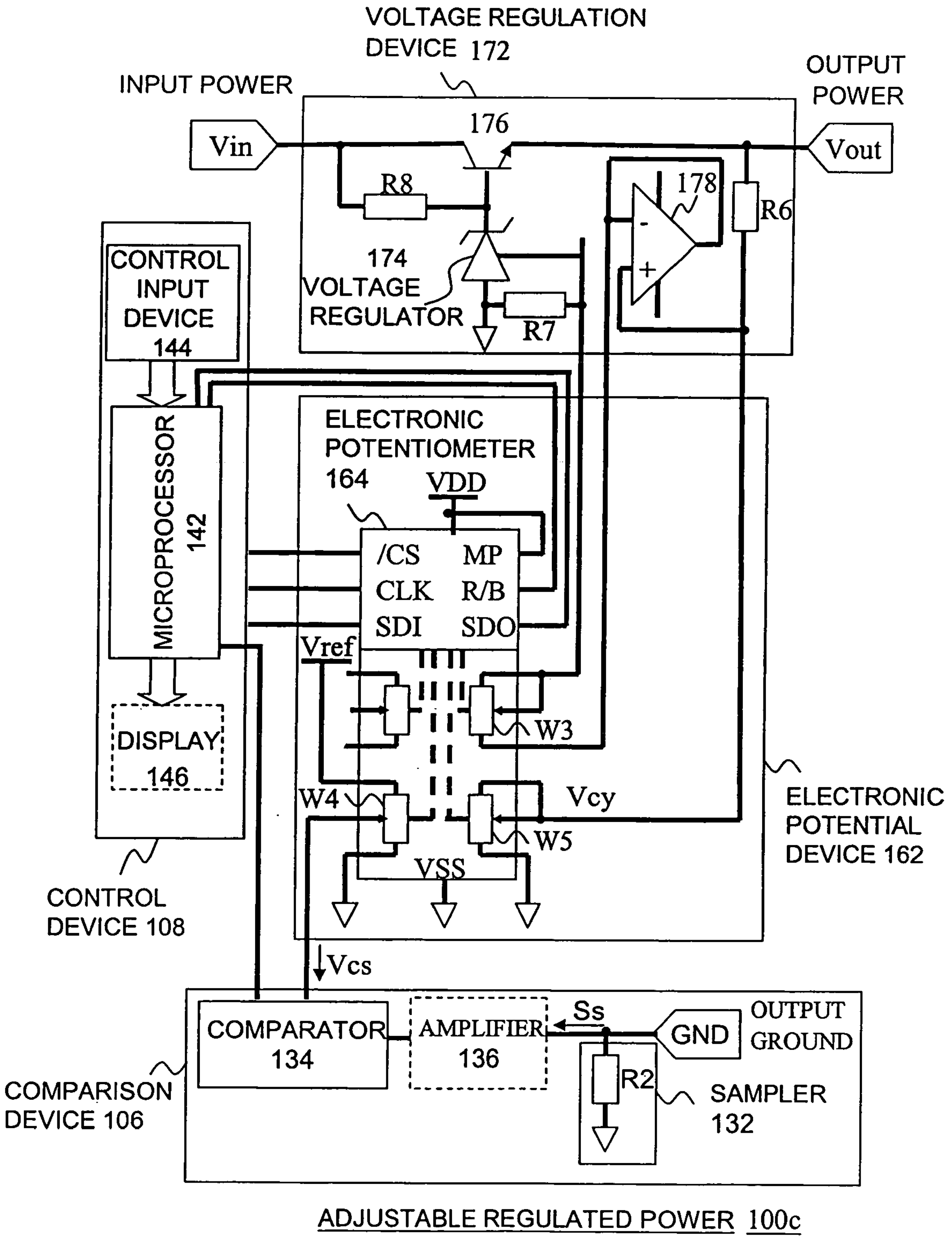
FIG. 1C is a schematic circuit drawing of an adjustable regulated power device according to one more embodiment of the present invention.

FIG. 1C is a schematic circuit drawing of an adjustable regulated power device according to one more embodiment of the present invention. Referring to FIG. 1C, the adjustable regulated power device 100*c* includes, for example, a comparison device 106 and a control device 108, which are the same as the ones in FIG. 1A. The adjustable regulated power device 100*c* further includes, for example, an electronic potential device 162 and a voltage regulation device 172, which are different from the ones in FIG. 1A.

Continuing to FIG. 1C, the electronic potential device 162 includes, for example, an electronic potentiometer 164. The voltage regulation device 172 includes, for example, a voltage regulator 174, a transistor 176, an operational amplifier 178, and resistors R6, R7 and R8. The center tapped end of a potentiometer W3 is connected to another end of the potentiometer to form a variable resistor, in series to the resistor R7, and to the reference end of the voltage regulator 174. Another end of the resistor R7 is grounded. The center tapped end of a potentiometer W5 is connected to another end of the potentiometer to form a variable resistor, to the same-phase input end of the operational amplifier 178 and to the resistor R6. Another end of the potentiometer W5 is grounded. An end of a potentiometer W4 is grounded, and another end thereof is connected to a reference voltage Vref. The center tapped end of W4 is connected to the comparison device 106 for outputting a base voltage Vcs to the comparison device 106.

In an embodiment of the present invention, the voltage regulator 174 can include, for example, a voltage regulation integrated circuit (IC) TL431. The anode of the IC is grounded, and the cathode thereof is connected to the resistor R8 and the base of the transistor 176. Another end of the resistor R8 and the collector of the transistor 176 are together connected to an input power Vin. The emitter of the transistor 176 is connected to an output voltage Vout. The output end of the operational amplifier 178 is connected to the phase-inverted input end thereof to form a follower, and to another end of the potentiometer W3. Another end of the resistor R6 is connected to the output voltage Vout.

Referring to FIG. 1C, the resistor R6 and the potentiometer W5 form a sampling circuit to sample the output voltage Vout and to produce a sampling voltage Vcy proportional to the output voltage Vout. Thus, the sampling voltage Vcy can be expressed by the following equation:

$$Vcy = Vout \times \frac{W5}{R6 + W5} = \frac{Vout}{K1} \tag{3}$$

Wherein, K1=(R6+W5)/W5=(1+R6/W5), is a proportional factor. Remarkably, the parameter setting must guarantee that the maximum sampling voltage Vcy does not reach or exceed the power voltage of the electronic potentiometer 164.

In the embodiment, the operational amplifier 178 can play a voltage follower, the output voltage and the input voltage thereof are the same. Thus, if the voltage regulator 174 is TL431, the output voltage Vout can be expressed by the following equation (4):

$$Vout = 2.5V \times K1 \times \left(1 + \frac{W3}{R7}\right) = 2.5V \times \left(1 + \frac{R6}{W5}\right) \times \left(1 + \frac{W3}{R7}\right) \tag{4}$$

Referring to FIG. 1C and the equation (4), since both the adjustable potentiometers W3 and W5 are employed, it results in sufficient adjustment accuracy and a broader adjustment range of the output voltage. In an embodiment of the present invention, for example, the nominal maximum value of the electronic potentiometer 164 is 10 KOhm, R6 is 5 KOhm and R7 is 10 KOhm. By the equation (4), when W3 and W5 are about 0 and 10 KOhm, respectively, the minimum value of the output voltage Vout is about Vout=2.5V×1.5×1=3.75V. When W3 and W5 are about 10 KOhm and 1 KOhm, respectively, the maximum value of the output voltage Vout is Vout=2.5V×6×2=30V. It can be seen that the lower the output voltage is, and the higher the adjustment accuracy thereof is. Even as the output voltage reaches 30V and the proportional factor K1 is 6 already, the corresponded adjustment accuracy, 2.5V×6/256=0.059V, is still high. Comparing to the embodiments in FIGS. 1A and 1B, the adjustment range of the output voltage in FIG. 1C is broader and the accuracy thereof is high.

Figure 1D:
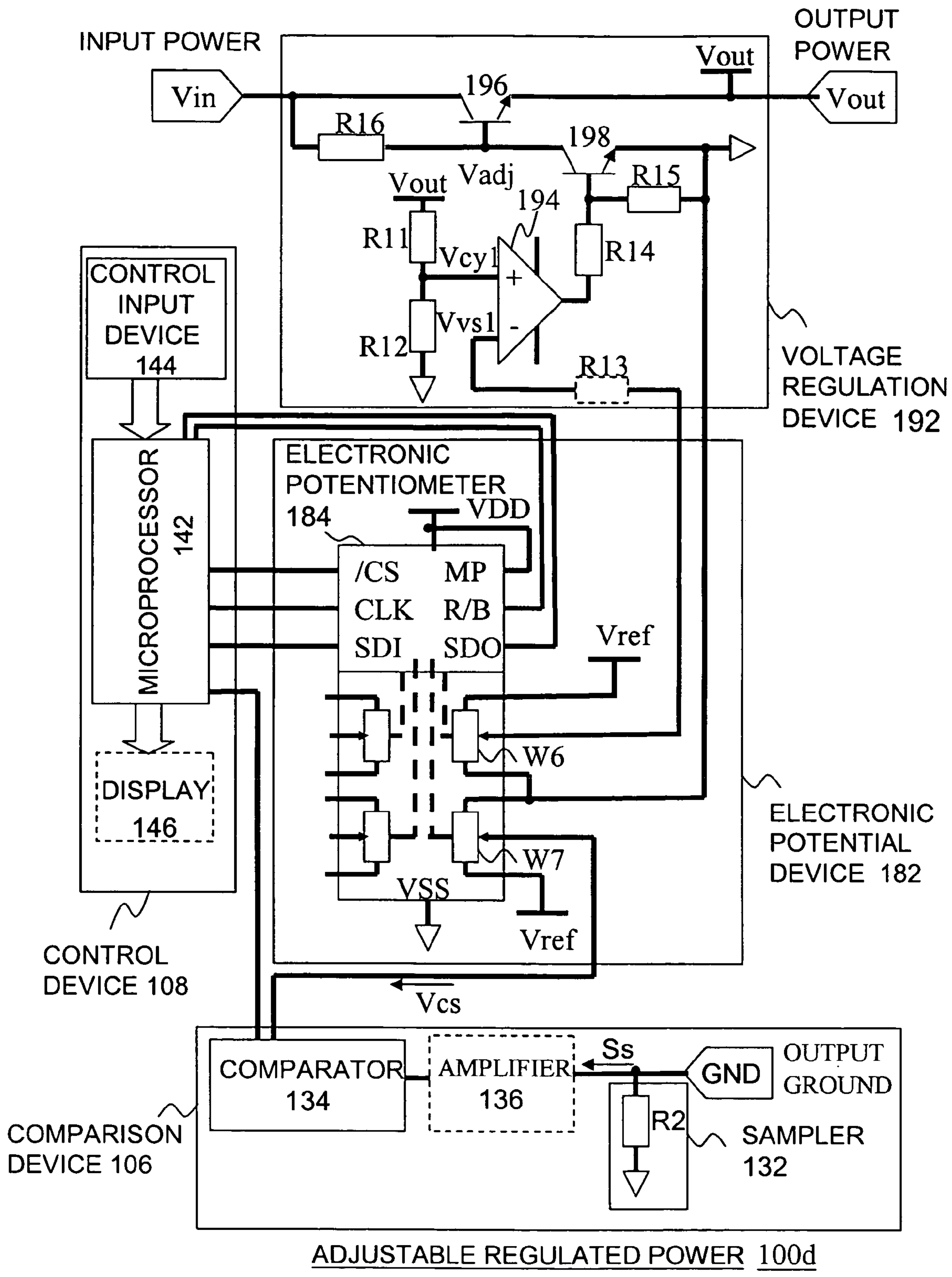
FIG. 1D is a schematic circuit drawing of an adjustable regulated power device according to one more embodiment of the present invention.

FIG. 1D is a schematic circuit drawing of an adjustable regulated power device according to one more embodiment of the present invention. Referring to FIG. 1D, the adjustable regulated power device 100*d* includes, for example, a comparison device 106 and a control device 108, which are the same as the ones in FIG. 1A. The adjustable regulated power device 100*d* further includes, for example, an electronic potential device 182 and a voltage regulation device 192, which are different from the ones in FIG. 1A.

Continuing to FIG. 1D, the electronic potential device 182 includes, for example, an electronic potentiometer 184. The voltage regulation device 192 includes, for example, an operational amplifier 194, transistors 196 and 198, and resistors R11–R16. An end of a potentiometer W6 is connected to a reference voltage Vref, and another end thereof is grounded. The center tapped end of the potentiometer W6 is directly (or through a compensation resistor R13) connected to the phase-inverted input end of the operational amplifier 194. An end of a potentiometer W7 is connected to the reference voltage Vref, and another end thereof is grounded. The center tapped end of W7 is, the same as in FIG. 1A, connected to the comparator 134.

In an embodiment of the present invention, the resistor R11 in the voltage regulation device 192 is connected in series to R12. Another end of R11 is connected to the output voltage Vout. Another end of R12 is grounded. The serial node between R11 and R12 is connected to the same-phase input end of the operational amplifier 194. The output end of the operational amplifier 194 is connected to an end of the resistor R14. The base of the transistor 198 is connected to another end of the resistor R14 and the resistor R15, the emitter thereof is connected to another end of R15 and grounded, and the collector thereof is connected to the resistor R16 and the base of the transistor 196. The collector of the transistor 196 and another end of the resistor R16 are together connected to an input power Vin, and the emitter thereof is connected to the output voltage Vout.

Referring to FIG. 1D, the resistors R11 and R12 can be used for sampling the output voltage Vout, and a sampling voltage Vcy1 is given at the serial node between them. The potentiometer W6 produces a base voltage Vvs1. Thus, adjusting the base voltage Vvs1 can regulate the output voltage value. In an embodiment of the present invention, if the output voltage Vout is smaller than a target value, the voltage Vcy1 would be smaller than the base voltage Vvs1. Consequently, the output from the operational amplifier 194 gets smaller, and an adjustment voltage Vadj and the output voltage Vout get larger. On the contrary, if the output voltage Vout is larger than the target value, the voltage Vcy1 would be larger than the base voltage Vvs1. Consequently, the output from the operational amplifier 194 gets larger, and the adjustment voltage Vadj and the output voltage Vout get smaller. The output voltage Vout is determined by the following equation (5):

$$Vout = Vs1 \times \left(1 + \frac{R11}{R12}\right) = Vvs1 \times K2 \quad (5)$$

Wherein, K2=(1+R11/R12), K2 is a proportional factor. In addition, the value of the base voltage Vvs1 is proportional to the value of the potentiometer W6, and the adjustable range thereof is from 0V to the reference voltage Vref. In an embodiment of the present invention, the user can enter a desired voltage value by a control input device 144, which is similar as the described in FIG. 1A.

Referring to the equation (5), in an embodiment of the present invention, if the reference voltage Vref is set as 5.12V, then the adjustment accuracy of the base voltage Vvs1 determined by the potentiometer W6 is 5.12V/256=20 mV If the setting values of the resistors R11 and R12 make K2=5, then the adjustment accuracy of the output voltage Vout is 20 mV×5=0.1V with a maximum output voltage 5.12V×5=25.6V. It can be seen that both of the adjustment range and the adjustment accuracy with the embodiment are good. To further enhance the adjustment accuracy or increase the adjustment range, another potentiometer can be added in serial connection with the potentiometer W6. In this way, the enhanced adjustment accuracy can be double.

Figure 2:
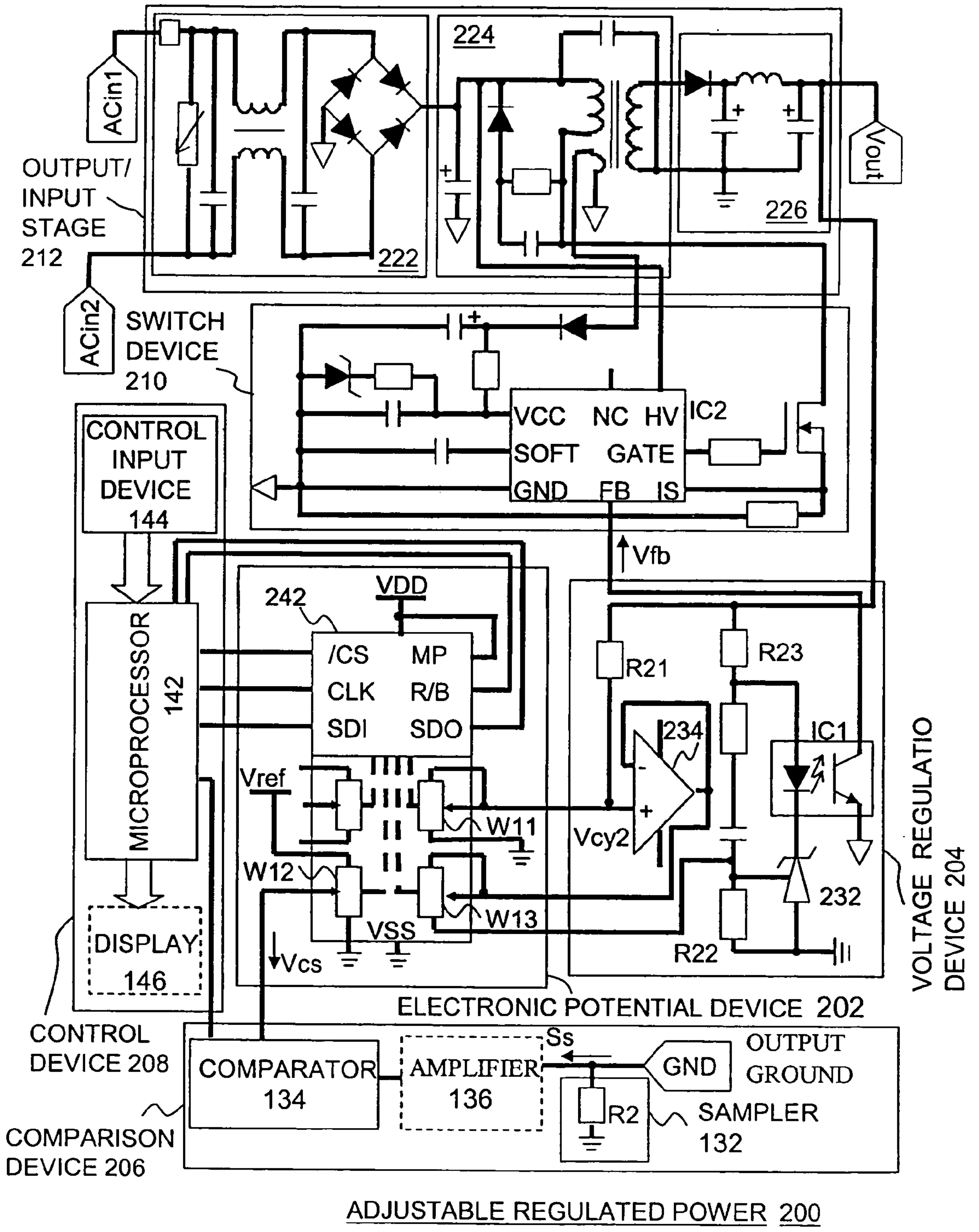
FIG. 2 is a schematic circuit drawing of an adjustable regulated power device according to one more embodiment of the present invention.

FIG. 2 is a schematic circuit drawing of an adjustable regulated power device according to further an embodiment of the present invention. Referring to FIG. 2, the adjustable regulated power device 200 is suitable for, for example, an adjustable regulated switching power device with a utility AC input in 110V, 220V or the other voltages. The adjustable regulated power device 200 includes, for example, an electronic potential device 202, a voltage regulation device 204, a comparison device 206, a control device 208, a switching device 210 and an output/input stage 212.

In an embodiment of the present invention, the output/input stage 212 includes, for example, an input stage 222, a transformer stage 224 and an output stage 226. The input stage 222 is used for, for example, converting an AC input power into a DC power. Through controlling by the switching device 210, the transformer stage 224 converts the input DC power into an AC power, followed by coupling the AC power to the output stage 226. The output stage 226 receives the input from the transformer stage 224, conducts operations of rectification and filtering on the input, and finally gets a DC power for output. For safety consideration, the output/input stage 212 employs the transformer stage 224 in the transmission power stream to isolate the output stage 226 from the input stage 222.

In an embodiment of the present invention, the voltage regulation device 204 can be used for sampling the output voltage Vout, comparing the sampling signal with a base voltage and outputting a signal Vfb into the switching device 210 to adjust the output voltage Vout. The signal Vfb is used as a negative feedback input for an entire close feedback loop to make the output voltage Vout regulated.

In an embodiment of the present invention, the voltage regulation device 204 mainly includes, for example, a photoelectric coupler (IC1), a voltage regulator 232 and an operational amplifier 234. The voltage regulator 232 includes, for example, a voltage regulation IC TL431. The switching device 210 mainly includes, for example, a switch power control IC (IC2). The electronic potential device includes, for example, an electronic potentiometer 242. Wherein, the center tapped end of a potentiometer W11 is connected to another end thereof to form a variable resistor. The center tapped end is also connected in series to a resistor R21 and to a positive-phase input end of the operational amplifier 234. Another end of the potentiometer W11 is grounded and another end of the resistor R21 is connected to the output voltage Vout. It should be noted that due to some power source is the AC power with 110/210 Volts, the ground terminals in different marks represents the different ground terminal for safety. However, the proper grounding in circuits should be understood by the ordinary skilled artisans. The center tapped end of a potentiometer W13 is connected to another end thereof to form a variable resistor. The center tapped end of W13 is also connected to both the phase-inverted input end and the output end of the operational amplifier 234. In this way, the operational amplifier 234 forms a follower. Another end of the potentiometer W13 is connected in series to a resistor R22 and to the reference end of TL431. Another end of the resistor R22 is connected to the anode of TL431 and to the ground. The cathode of TL431 is connected to the cathode of a light emitting diode in the photoelectric coupler (IC1), and the anode of the light emitting diode is connected to the output voltage Vout through a serial current-limit resistor R23. The emitter of a photoelectric cell in IC1 is connected to a common ground for the power parts. The base thereof is connected to a feedback control end FB of the switch power control IC (IC2). As shown in FIG. 2, the IC1 circuit connections are the same as the typical one in conventional applications.

In an embodiment of the present invention, in terms of the composition, the connection method and the function, the voltage regulation device 204 and the comparison device 206 in FIG. 2 are similar to or the same as the voltage regulation device 104 and the comparison device 106 in FIG. 1A or FIG. 1C. In terms of the connection between the electronic potential device and the above-mentioned voltage regulation device or comparison device and the operation mode thereof, the electronic potential devices 202 in FIG. 2 is similar to or the same as the electronic potential devices 162 in FIG. 1C. For simplicity, the similar parts are omitted to describe. An end of a potentiometer W12 is connected to a stable, precise reference voltage Vref, and another end thereof is grounded. The center tapped end of the potentiometer W12 outputs a base voltage Vcs to a comparator 134 in the comparison device 206. The comparator 134 would compare the voltage Vcs with the sampling signal produced by a sampler 132 and output a comparison result to a microprocessor 142.

In an embodiment of the present invention, a quad operational amplifier IC (for example, LM324) is employed to substitute the operational amplifier 234, amplifier 136 and the comparison device 206. Referring to FIG. 2, the resistor R21 and the potentiometer W 11 form a primary sampling circuit to sample the output voltage Vout. The produced sampling voltage Vcy2 is proportional to the output voltage Vout and expressed by:

$$Vcy2 = Vout \times \frac{W11}{R21 + W11} = \frac{Vout}{K3} \quad (6)$$

Wherein, K3=(R21+W11)/W11=(1+R21/W11), K3 is a proportional factor. Remarkably, the parameter setting must guarantee, the maximum sampling voltage Vcy2 does not reach or exceed the power voltage of the electronic potentiometer 242.

The operational amplifier 234 can play a voltage follower, the output voltage and the input voltage thereof are the same. The potentiometer W13 and the resistor R22 form a sampling control circuit of the voltage regulator 232. When the voltage regulator 232 is TL431, the output voltage Vout can be expressed by the following equation (7):

$$Vout = 2.5V \times K3 \times \left(1 + \frac{W13}{R22}\right) = 2.5V \times \left(1 + \frac{R21}{W11}\right) \times \left(1 + \frac{W13}{R22}\right) \quad (7)$$

Referring to FIG. 2 and the equation (7), since both the adjustable potentiometers W11 and W13 are employed, it results in sufficient adjustment accuracy and a broader adjustment range of the output voltage. In an embodiment of the present invention, for example, the nominal maximum value of the electronic potentiometer 242 is 10 KOhm, R21 is 5 KOhm and R22 is 10 KOhm. By the equation (7), when W11 and W13 are about 10 KOhm and 0, respectively, the minimum value of the output voltage Vout is about Vout=2.5V×1.5×1=3.75V. While W11 and W13 are about 1 KOhm and 10 KOhm, respectively, the maximum value of the output voltage Vout is Vout=2.5V×6×2=30V. It can be seen that the lower output voltage result in the higher adjustment accuracy thereof. Even as the output voltage reaches 30V and the proportional factor K3 is 6 already, the corresponded adjustment accuracy, 2.5V×6/256=0.059V, is still high. The embodiment features a broader adjustment range and a higher adjustment accuracy of the output voltage. In addition, the adjustment range can be easily determined only by the design parameters of the voltage regulation device. The related functions and the operation mode of the embodiment are similar as the described in FIG. 1C.

In another embodiment of the present invention, the electronic potential device and the voltage regulation device above-described in FIGS. 1A, 1B and 1D can be slightly modified to replace those in the embodiment of the regulated switching power device shown in FIG. 2. Due to the similar or same control mode, for simplicity it is omitted to describe.

It will be apparent to those skilled in the art that various modifications and variations can be made to the structure of the present invention without departing from the scope or spirit of the invention. In view of the foregoing, it is intended that the specification and examples to be considered as exemplary only, with a true scope and spirit of the invention being indicated by the following claims and their equivalents.

What is claimed is:

1. An adjustable regulated power device, comprising:

an electronic potential device, comprising an electronic potentiometer having a plurality of potentiometers;

a voltage regulation device, comprising a voltage regulator, which is connected to an input power and at least one first potentiometer of said potentiometers, wherein said first potentiometer forms a variable resistor, which can adjust an output voltage from said voltage regulator; and a control device, comprising a microprocessor and a control input device, wherein said control input device is used for receiving an input setting value, and said microprocessor is connected to said control input device and said electronic potentiometer for receiving said setting value and controlling said electronic potentiometer according to said setting value.

2. The adjustable regulated power device as recited in claim 1, further comprising;

a comparison device, comprising a sampler and a comparator, wherein said sampler is used to sample the current of said output voltage for producing a sampling signal, and said comparator is connected to a second potentiometer among said potentiometers and to said sampler for receiving and comparing a base voltage from said second potentiometer and said sampling signal from said sampler and then outputting a comparison result.

3. The adjustable regulated power device as recited in claim 2, wherein said comparison device further comprises:

an amplifier, which is connected between said sampler and said comparator for receiving and amplifying said sampling signal from said sampler, and then inputting said sampling signal into said comparator, wherein said comparator outputs said comparison result to said microprocessor to control said electronic potentiometer according to said setting value and said comparison result.

4. The adjustable regulated power device as recited in claim 1, wherein said setting value comprises either a current-limit value, according to said current-limit value said microprocessor controls said electronic potentiometer to fulfill the current-limit function of said output voltage, or two current-limit values, according to said two current-limit values said microprocessor controls said electronic potentiometer to limit the current of said output voltage to between said two current-limit values to fulfill the constant current function.

5. The adjustable regulated power device as recited in claim 4, wherein, if the voltage value of said output voltage is increased to an extent exceeding an output voltage setting value among said setting values and the system still fails to keep said output voltage in constant current status, then said output voltage is no longer increased and the system enters a constant voltage status.

6. The adjustable regulated power device as recited in claim 1, wherein said control input device includes a keyboard, a keypad, a mouse, a light pen, or other input devices.

7. The adjustable regulated power device as recited in claim 1, wherein said control device further comprises:

a display, connected to said microprocessor for displaying a digital value, an output voltage value, a current-limit value of said setting values fed by said control input device, or an operation status of said adjustable regulated power device.

8. The adjustable regulated power device as recited in claim 1, wherein said voltage regulation device further comprises:

a sampling circuit connected to said output voltage and said first potentiometer for sampling the voltage of said output voltage to produce a sampling voltage for controlling the voltage of said output voltage.

9. The adjustable regulated power device as recited in claim 1, wherein said voltage regulation device further comprises:

a sampling circuit, connected to said output voltage and at least one of said potentiometers for sampling the voltage of said output voltage to produce a sampling voltage; and a comparison circuit, connected to said sampling circuit and said first potentiometer for controlling the voltage of said output voltage according to said sampling voltage.

10. The adjustable regulated power device as recited in claim 1, wherein an adjustment accuracy of said output voltage can be enhanced by increasing the number of said potentiometers connected to said voltage regulation device.

11. An adjustable regulated power device, comprising:

an electronic potential device comprising an electronic potentiometer having a plurality of potentiometers;

an output/input stage used for receiving an input power and producing an adjustable output voltage;

a switching device connected to said output/input stage;

a voltage regulation device, comprising a voltage regulator, wherein said voltage regulator is connected to said output/input stage, said switching device and at least one first potentiometer of said potentiometers, wherein said first potentiometer forms a variable resistor used for controlling said voltage regulation device and a close feedback loop formed in said switching device, so as to regulate the voltage of said output/input stage; and a control device, comprising a microprocessor and a control input device, wherein said control input device is used for receiving an input setting value, and said microprocessor is connected to said control input device and said electronic potentiometer for receiving said setting value and controlling said electronic potentiometer according to said setting value.

12. The adjustable regulated power device as recited in claim 11, further comprising;

a comparison device, comprising a sampler and a comparator, wherein said sampler is used to sample said output voltage for producing a sampling signal, and said comparator is connected to a second potentiometer among said potentiometers and to said sampler for receiving and comparing a base voltage from said second potentiometer and said sampling signal from said sampler and then outputting a comparison result.

13. The adjustable regulated power device as recited in claim 12, wherein said comparison device further comprises:

an amplifier, which is connected between said sampler and said comparator for receiving and amplifying said sampling signal from said sampler, and then inputting said sampling signal into said comparator, wherein said comparator outputs said comparison result to said microprocessor to control said electronic potentiometer according to said setting value and said comparison result.

14. The adjustable regulated power device as recited in claim 11, wherein said setting value comprises either a current-limit value, according to said current-limit value, said microprocessor controls said electronic potentiometer to fulfill the current-limit function of said output voltage; or two current-limit values, according to said two current-limit values, said microprocessor controls said electronic potentiometer to limit the current of said output voltage to between said two current-limit values to fulfill the constant current function.

15. The adjustable regulated power device as recited in claim 14, wherein, if the voltage value of said output voltage is increased to an extent exceeding an output voltage setting value among said setting values and the system still fails to keep said output voltage in constant current status, then said output voltage is no longer increased and the system enters to a constant voltage status.

16. The adjustable regulated power device as recited in claim 11, wherein said control input device includes a keyboard, a keypad, a mouse, a light pen, or other input devices.

17. The adjustable regulated power device as recited in claim 11, wherein said control device further comprises a display connected to said microprocessor for displaying a digital value, an output voltage value, and a current-limit value of said setting values fed by said control input device, or an operation status of said adjustable regulated power device.

18. The adjustable regulated power device as recited in claim 11, wherein said voltage regulation device further comprises:

a sampling circuit connected to said output voltage and said first potentiometer for sampling the voltage of said output voltage to produce a sampling voltage, wherein the voltage of said output voltage is controlled according to the sampling voltage.

19. The adjustable regulated power device as recited in claim 11, wherein said voltage regulation device further comprises:

a sampling circuit connected to said output voltage and at least one of said potentiometers for sampling the voltage of said output voltage to produce a sampling voltage; and a comparison circuit connected to said sampling circuit and said first potentiometer for controlling the voltage of said output voltage according to said sampling voltage.

20. The adjustable regulated power device as recited in claim 11, wherein an adjustment accuracy of said output voltage is enhanced by increasing the number of said potentiometers connected to said voltage regulation device.

* * * * *